United States Patent
Pérez Valencia et al.

(10) Patent No.: US 12,258,436 B2
(45) Date of Patent: Mar. 25, 2025

(54) METHOD FOR THE PREPARATION OF POLYMER POLYOLS

(71) Applicant: REPSOL, S.A., Madrid (ES)

(72) Inventors: Juan Pedro Pérez Valencia, Madrid (ES); José Antonio Carazo Angulo, Madrid (ES); Félix Fernández Villar, Madrid (ES)

(73) Assignee: REPSOL, S.A, Madrid (ES)

( * ) Notice: Subject to any disclaimer, the term of this patent is extended or adjusted under 35 U.S.C. 154(b) by 0 days.

(21) Appl. No.: 18/720,840

(22) PCT Filed: Nov. 29, 2023

(86) PCT No.: PCT/EP2023/083452
§ 371 (c)(1),
(2) Date: Jun. 17, 2024

(87) PCT Pub. No.: WO2024/126039
PCT Pub. Date: Jun. 20, 2024

(65) Prior Publication Data
US 2024/0417507 A1    Dec. 19, 2024

(30) Foreign Application Priority Data
Dec. 15, 2022   (EP) .................... 22383216

(51) Int. Cl.
*C08G 18/00*      (2006.01)
*B01J 19/00*      (2006.01)
(Continued)

(52) U.S. Cl.
CPC ........ *C08G 18/632* (2013.01); *B01J 19/0066* (2013.01); *B01J 19/06* (2013.01);
(Continued)

(58) Field of Classification Search
CPC ........ B01J 19/0066; B01J 19/06; B01J 19/18; B01J 2219/00031; B01J 2219/00033; C08G 18/632; C08F 283/06
See application file for complete search history.

(56) References Cited

U.S. PATENT DOCUMENTS

| 4,454,255 A | 6/1984 | Ramlow et al. |
| 9,505,881 B1 | 11/2016 | Adkins et al. |

(Continued)

FOREIGN PATENT DOCUMENTS

| CN | 101642688 A | 2/2010 |
| WO | WO 2008/145729 A1 | 12/2008 |
| WO | WO 2019/003209 A1 | 1/2019 |

OTHER PUBLICATIONS

EPO International Search Report issued for PCT/EP2023/083452, mailed Feb. 19, 2024, 12 pages.

*Primary Examiner* — Anshu Bhatia
(74) *Attorney, Agent, or Firm* — Casimir Jones, S.C.; Tristan A. Fuierer (57) ABSTRACT

The present invention refers to the use of hydrofoil impellers for the preparation of polymer polyols and to a method for preparing a polymer polyol, which comprises reacting a base polyol, at least one ethylenically unsaturated monomer and a macromer or a preformed stabilizer in the presence of a free-radical initiator and optionally a chain transfer agent in a reactor, wherein said reactor is stirred by means of a stirring system comprising a shaft rotatable about its longitudinal axis, and a plurality of radially extending hydrofoil impellers mounted on the shaft and respectively axially spaced apart and wherein the reactor does not contain baffles.

20 Claims, 3 Drawing Sheets

(51) Int. Cl.
  *B01J 19/06* (2006.01)
  *B01J 19/18* (2006.01)
  *C08F 283/06* (2006.01)
  *C08G 18/63* (2006.01)

(52) U.S. Cl.
  CPC ............ *B01J 19/18* (2013.01); *C08F 283/06* (2013.01); *B01J 2219/00031* (2013.01); *B01J 2219/00033* (2013.01)

(56) References Cited

U.S. PATENT DOCUMENTS

| | | | |
|---|---|---|---|
| 2020/0148819 A1* | 5/2020 | Daliparthi | C08G 64/307 |
| 2020/0299479 A1* | 9/2020 | Claessens | C08G 18/633 |
| 2020/0392285 A1* | 12/2020 | Okada | C08G 18/6688 |
| 2022/0241748 A1* | 8/2022 | Hutchinson | B01J 19/0066 |

* cited by examiner

METHOD FOR THE PREPARATION OF POLYMER POLYOLS

CROSS-REFERENCE TO RELATED APPLICATIONS

This application is filed under the provisions of 35 U.S.C. § 371 and claims the priority of International Patent Application No. PCT/EP2023/083452 filed on 29 Nov. 2023 entitled "METHOD FOR THE PREPARATION OF POLYMER POLYOLS" in the name of Juan Pedro PÉREZ VALENCIA, et al., which claims priority to European Patent Application No. 22383216.3, filed on 15 Dec. 2022, both of which are hereby incorporated by reference herein in their entirety.

FIELD OF THE INVENTION

The present invention relates to an advantageous method for preparing polymer polyols, which comprises the use of hydrofoil impellers.

BACKGROUND

Polymer polyols are high volume commercial products whose main use is the production of polyurethane foams. Polymer polyols contain dispersions of particles of a vinyl polymer in liquid base polyol formed from the in situ polymerization of selected compounds, such as acrylonitrile, styrene, methyl methacrylate and vinyl chloride. Commercially, the most important products are based on acrylonitrile and styrene.

The presence of the polymer particles in the polyol imparts various desirable properties to polyurethanes, particularly flexible polyurethane foams prepared from the polyol. In particular, the polymer particles act as a reinforcing filler and cell opener in the foam.

Polymer polyols are prepared by dispersion polymerization which first involves the production of radicals resulting from the thermal decomposition of a free-radical initiator, which in turn reacts with a vinylic monomer to form growing oligoradicals. Depending on its solubility in the medium, each oligoradical collapses into a condensed state when a certain threshold molecular weight is reached, giving rise to primary particles which attract either other primary particles or already existing larger ones.

Typically, azo compounds and peroxides are used as initiators. Reaction takes place at temperatures within the range 80 to 130° C., monomer being added to polyol at such a rate that its concentration remains low throughout the process. Chain transfer agents are generally used to control molecular weight and grafting of the base polyol (i.e. reaction of the initiator with the base polyol).

A problem generally found in the manufacture of polymer polyols is to obtain a polymer polyol having both a relatively high solid polymer content and a sufficiently low viscosity for ease of handling. A polymer polyol having this combination of properties is favourable for the properties of polyurethane foam produced from such polymer polyol.

High level of dispersed polymer particles (a concentrated polymer polyol) provides enhanced reinforcement and cell opening. In addition, the production of high level solids polymer polyols increases productivity since it is possible to get products containing smaller amounts just by diluting the concentrated product.

One problem with concentrated polymer polyol is that the dispersed polymer particles tend to agglomerate and then settle out of the continuous polyol phase invalidating its use. It is therefore desirable to prepare the concentrated polymer polyol in such a way that the tendency of the particles to agglomerate is minimized.

Another problem of concentrated polymer polyol dispersions is the exponential increase in viscosity with polymer particle content which usually hampers polymer particle concentration up to a viscosity limit, since pumping equipment used by foamers generally cannot handle high viscosities at an acceptable rate or with acceptable accuracy.

Furthermore, polymer polyols should not contain large particles (e.g. d (0.5)>3-5 μm) which may affect foam mechanical properties but neither small particles (e.g. d (0.5)<0.2 μm) that could be detrimental for viscosity.

In order to improve the stability of the polymer polyol dispersions and to avoid the problems mentioned above, stabilizers or dispersants are generally used.

The most successful type of dispersant devised for use in dispersion polymerization are based on a block or graft copolymer which consists of two essential polymeric components, one soluble and one insoluble in the continuous phase. The insoluble component, or anchor group, associates with the disperse phase polymer. It may become physically absorbed into the polymer particle, or can be designed so that it reacts chemically with the disperse phase after absorption.

The dispersant may be either preformed or formed in situ. In any of these cases, a precursor is usually employed. This precursor is also known as "macromonomer" or "macromer". Macromers are polyether polyols (identical or different to the liquid base polyol) with terminal double bonds, able to copolymerize with vinylic monomers and to form graft species during the radical copolymerization. The polyol part typically contains long chains that are highly soluble in the continuous phase of the polymer polyol. The resulting block copolymer after reacting the macromer with vinylic monomers is in fact a non-aqueous dispersant which introduces polyol-soluble moieties onto the copolymer particles leading to improved particle stability.

Thus, polymer polyol processes are divided in two, depending on dispersant synthesis:

In situ formation simultaneously to polymer polyol synthesis process. In this process, macromer is added to the organic liquid serving as the polymerization medium (liquid base polyol). The monomer system being polymerized will react with the macromer during polymerization to form, in situ, a graft or addition copolymer dispersant. Thus, this process involves the simultaneous dispersion polymerization of monomers to produce polymer particles and block copolymer dispersant formation by grafting reaction of a macromonomer or macromer and monomers.

Preformed stabilizer synthesis. In this case, the graft copolymer dispersant synthesis takes place apart from the main polymerization process, in a dedicated synthesis. Reaction procedure is similar to polymer polyol synthesis (it uses the same or similar reaction scheme, initiator, chain transfer agent, monomers . . . ) but employing different concentrations and similar or different reaction conditions (temperature, pressure, residence time, mixing regime . . . ), leading to a concentrated preformed stabilizer product which is added to polymer polyol reaction process.

Batch, semi-batch and continuous processes have been described for the manufacture of polymer polyols.

U.S. Pat. No. 9,505,881 B1 describes a process for the preparation of polymer polyols comprising mixing, among others, a base polyol, one or more ethylenically unsaturated monomers, a preformed dispersing agent in the presence of a free-radical reaction initiator and optionally a chain transfer agent. Use of a reactor comprising impeller(s) and baffles is disclosed in this document.

Chinese patent application CN 101642688 discloses a device for dissolving, curing and stirring hydrophobic associating polymers, said device comprising a driving device, a stirring and driving decelerating mechanism, a stirring shaft, and a stirring paddle mounted on the stirring shaft.

International patent application WO 2019/003209 A1 discloses the reaction of melt oligomerization of carbonate compounds with a bisphenol compound leading to the formation of polycarbonates. The reactor employed for said reaction is one comprising a cylindrical tank and a stirring device with a plurality of blades. In addition, said reactor may comprise one or more baffles, which may be circular or vertical. The presence of circular baffles advantageously allows reducing the mixing time in the disclosed application. Despite the methods for preparing polymer polyols disclosed in the prior art, there is still room for improvement. In this regard, further effective methods for preparing polymer polyols are desirable, especially methods for preparing polymer polyols with a narrow particle size distribution along with a high solid content and suitable viscosity.

BRIEF DESCRIPTION OF THE INVENTION

The authors of the present invention have found that the use of hydrofoil impellers allows reducing the particle size distribution (span) compared to other stirring systems. This lower span results in an improved filterability and higher quality of the resulting polymer.

Also, the resulting polymer polyols have a high solids content and good viscosity.

Further, baffles are generally employed in stirred reactors to optimize mixing. Surprisingly, the inventors have found that the use of hydrofoil impellers allows the effective preparation of polymer polyols, with a controlled particle size, even in a reactor without baffles. In this way the risk of product deposits or fouling on the baffle surface is avoided. This is particularly advantageous in a continuous process, since it avoids the need to stop the process in order to clean the reactor and so allows maintaining the continuous operation of the reactor for a longer time.

Thus, the invention is directed to a method for preparing a polymer polyol, comprising reacting a base polyol, at least one ethylenically unsaturated monomer, and a macromer or a preformed stabilizer, in the presence of a free-radical initiator and optionally a chain transfer agent in a reactor, wherein said reactor is stirred by means of a stirring system comprising a shaft rotatable about its longitudinal axis, and a plurality of radially extending hydrofoil impellers mounted on the shaft and respectively axially spaced apart and wherein the reactor is devoid of baffles.

In another aspect, the invention is directed to a polymer polyol obtained by the method of the invention.

In a further aspect, the invention relates to the use of a stirring system comprising a shaft rotatable about its longitudinal axis, and a plurality of radially extending hydrofoil impellers mounted on the shaft and respectively axially spaced apart in a reactor devoid of baffles for the preparation of a polymer polyol.

FIGURES

To complement the description that will be made below and for the purpose of aiding to better understand the features of the invention according to a particular practical embodiment thereof, drawings are attached as an integral part of said description in which the following has been depicted with an illustrative and non-limiting character.

DETAILED DESCRIPTION OF THE INVENTION

Unless defined otherwise, all technical and scientific terms used herein have the same meaning as commonly understood to one of ordinary skilled in the art to which this disclosure belongs. As used herein, the singular forms "a" "an" and "the" include plural reference unless the context clearly dictates otherwise.

The term "comprising" encompasses the terms "consisting essentially of" and "consisting of". Thus, at each occurrence in the present application, the term "comprising" may be replaced with the term "consisting essentially of" and "consisting of".

Unless specifically stated otherwise, or unless they are clearly incompatible, all the embodiments disclosed in relation to an aspect of the invention are also applicable to the other aspects.

It should be understood that the scope of the present disclosure includes all the possible combinations of embodiments disclosed herein, either belonging to the same aspect or to different aspects of the invention.

As used herein, the term "wt %" means weight-weight percent (w/w). All percentages used herein are by weight of the total composition, unless otherwise designated.

The term "baffle" as used herein refers to a fixed plate intended for deflecting the flow.

The skilled person readily understands that, when a composition is defined by the weight percentage values of all the components it comprises, these values can never sum up to a value which is greater than 100%. The amount of all components that said composition comprises adds up to 100% of the weight of the composition.

When the amount of a component is given by a range with a lower limit of 0 or 0.0, this means that said component might not be present in the composition or it might be present in an amount not higher than the specified upper limit of the range.

When a range is indicated in the present document, both lower and upper limits are included in said range.

The term "about" as used herein refers to ±10% of the given value.

The term "polymer polyol", also referred to as dispersed polymer, refers to a composition (dispersion) produced by polymerizing one or more ethylenically unsaturated monomers dissolved or dispersed in a polyol (base polyol) in the presence of a free radical catalyst or initiator and a stabilizer to form a stable dispersion of polymer particles in the polyol. These polymer polyols have the valuable property of imparting to, for example, polyurethane foams and elastomers produced therefrom, higher load-bearing properties than are provided by the corresponding unmodified polyols.

Stirring System

Figure 1:
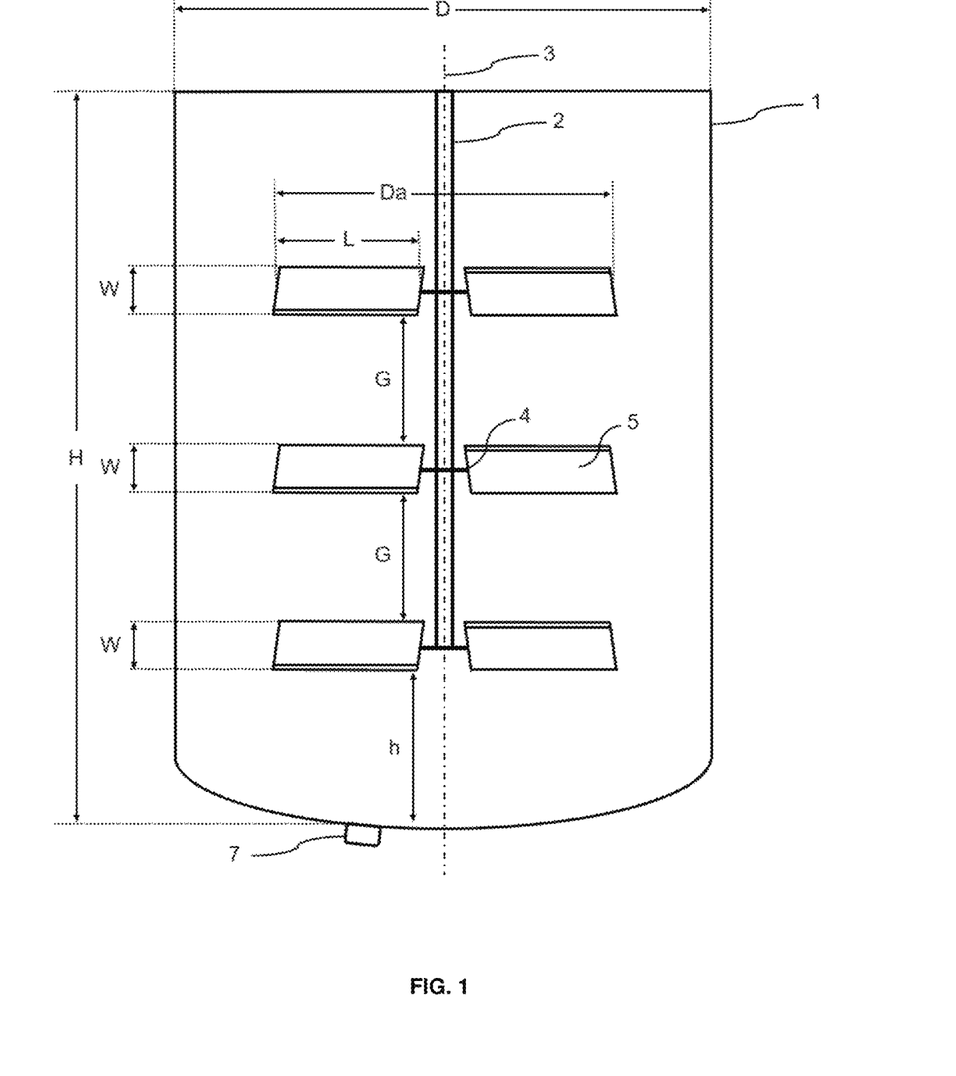
FIG. 1 shows a schematic view of a reactor and a stirring system according to a particular embodiment of the invention, shown in cross-section along a vertical plane to allow visualization of interior features.

FIG. 1 shows a sectional view in a vertical plane of a reactor according to a particular embodiment of the invention.

The reactor (1) according to FIG. 1 comprises a stirring system that comprises a shaft (2) rotatable about its longitudinal axis (3) and a plurality of radially extending hydrofoil impellers (4) mounted on the shaft and respectively axially spaced apart. Each hydrofoil impeller may comprise a plurality of blades (5).

Rotation of the shaft (2) generates rotation of the hydrofoil impellers (4), which promotes motion of the fluid (reagents or reaction components).

Although the shown embodiment has three hydrofoil impellers (4), each one with two blades (5), the stirring system according to the present invention can comprise a plurality of hydrofoil impellers (4) with a plurality of blades (5). Additionally, the presence of an inlet port (7) at the bottom of the reactor is optional. Alternatively, the reactor can comprise inlet and/or outlet ports at any part of the reactor (top, bottom or lateral walls of the reactor).

Figure 2:
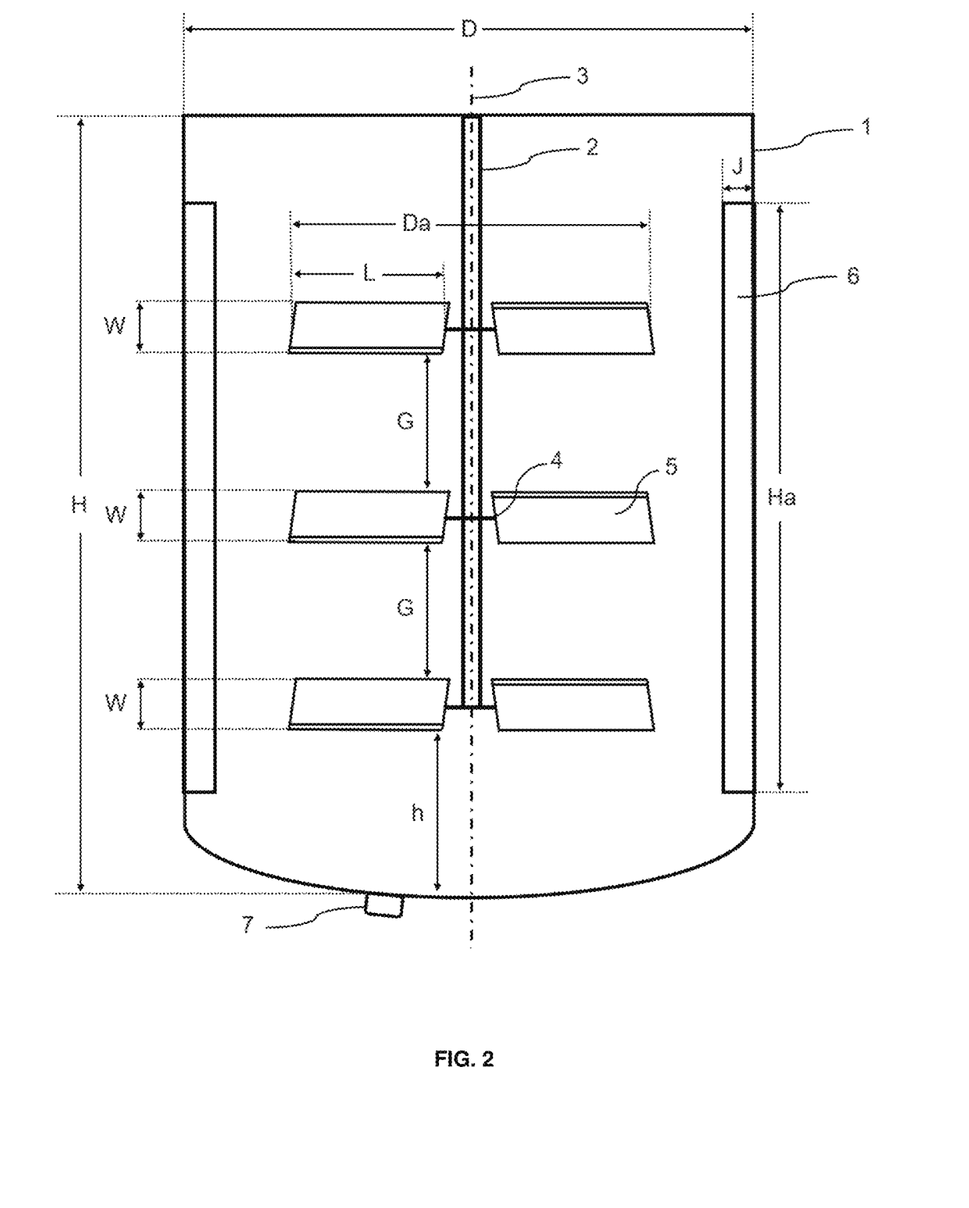
FIG. 2 shows a schematic view of a reactor comprising baffles (not according to the invention), shown in cross-section along a vertical plane to allow visualization of interior features.

FIG. 2 shows a sectional view in a vertical plane of a similar reactor but comprising baffles (not according to the invention). The flow of the fluid can be deflected by baffles (6) which can be, for example, in the form of straight flat plates vertically arranged inside the reactor. There is a certain distance of the hydrofoil impellers (4) from said baffles (6) and from the reactor walls (lateral, bottom and top) to allow rotation of the impellers.

The term "reactor" as used herein is interchangeable with "vessel" and "tank" and refers to any structure suitable for containing one or more process components, including gas, liquid or solid components and mixtures thereof.

The stirring system comprises a shaft rotatable about its longitudinal axis, and a plurality of radially extending hydrofoil impellers mounted on the shaft and respectively axially spaced apart.

The term "impeller" refers to a device that is used for agitating or mixing the contents of a reactor. The term "hydrofoil impeller" is well known in the art and refers to an impeller with hydrofoil blades, i.e. blades with a shape that has a hydrodynamic profile that generates a pressure difference between one side and the opposite side causing a lift effect that is used to generate a mixing flow with an axial component. The axial component of the flow causes there to be no stagnation regions and therefore portions of the fluid that do not mix.

The stirring system of the invention can be placed in any position in the reactor, vertically, horizontally or obliquely. In a preferred embodiment, the stirring system is placed centrally and vertically in the reactor.

The stirring system according to the present invention comprises only hydrofoil impellers.

In an embodiment, the stirring system has 2, 3, 4, 5 or 6 hydrofoil impellers mounted on the shaft. In a particular embodiment, it has 3-5 hydrofoil impellers, or even 3 or 5 hydrofoil impellers.

The hydrofoil impellers in the stirring system may be different or identical. In an embodiment, they are identical. In a further embodiment the plurality of impellers are uniformly arranged around the shaft. In an embodiment, the plurality of impellers are uniformly arranged according to the axial direction being the axial direction the longitudinal direction of the shaft, i.e. the plurality of impellers are axially equally spaced apart.

Each hydrofoil impeller comprises blades extending radially outwardly from the shaft. Each hydrofoil impeller comprises a plurality of blades, i.e. at least two blades. According to an embodiment, the number of blades in each hydrofoil impeller is independently selected from 2 to 6. In an embodiment, it is independently selected from 3, 4 or 5. In a further embodiment, each impeller comprises 3 or 5 blades.

The hydrofoil impellers can have the same number of blades or different. Preferably, all the hydrofoil impellers have the same number of blades.

The distance between two successive blades in an impeller is equal.

Preferably, the blades in the impellers are pitched blades.

Preferably, the blades in the impellers make an angle of less than 90° with the plane of rotation. In an embodiment, the angle the blades make with the plane of rotation, the pitch, is less than 65°. In a particular embodiment, the angle the blades make with the plane of rotation, the pitch, is less than 60°. In a further embodiment, the angle the blades make with the plane of rotation, the pitch, is less than 55°, or even less than 50°.

In an embodiment, the angle the blades make with the plane of rotation, the pitch, is between 18° and 65°. In a further embodiment, it is between 20° and 60°. In a particular embodiment, the angle the blades make with the plane of rotation, the pitch, is between 20° and 50°. In another embodiment, the angle the blades make with the plane of rotation, the pitch, is between 30° and 60°.

Preferably, the blades show a variable pitch wherein the pitch is decreasing from the near-shaft region towards the tip of the blade. According to an embodiment, the pitch value is decreasing from the range 40-65° at the hub or the near-shaft region to the range 18-35° at the tip. In an embodiment, the pitch value decreases from the range 40-60° at the hub or the near-shaft region to the range 20-35° at the tip.

In a particular embodiment, the pitch value is decreasing from the range 40-55° at the hub or the near-shaft region to the range 20-30° at the tip. In a further embodiment, the pitch value decreases from the range 40-50° at the hub or the near-shaft region to the range 20-28° at the tip.

In another embodiment, the pitch value is decreasing from the range 45-65° at the hub or the near-shaft region to the range 25-40° at the tip. In a further embodiment, the pitch value decreases from the range 50-60° at the hub or the near-shaft region to the range 28-38° at the tip.

In an embodiment, the pitch in the trailing edge of the blades is higher than the pitch in the leading edge. That is, the pitch increases from the leading edge to the trailing edge. This increase of pitch can be continuous (gradual) or non-continuous.

According to an embodiment, the blade comprises two pitches, a first pitch in a first region having the leading edge and a second pitch, higher than the first pitch, in a second region having the trailing edge. In a particular embodiment, said first and second regions are connected along a line wherein the pitch is non continuous.

Preferably, the blades within each hydrofoil impeller are identical. The blades in each hydrofoil impeller can be identical (in shape, dimensions, pitch) to the blades in the other hydrofoil impeller(s) of the stirring system. In an embodiment, the blades in each hydrofoil impeller are identical to the blades in the other hydrofoil impeller(s) of the stirring system.

In an embodiment, the impellers mounted on the shaft can be offset by an angle of 0 to 15 degrees, or of 0 to 10 degrees, or even 0 to 5 degrees. Preferably, there is no offset between the impellers. Said angle refers to the angle between a first blade of an impeller relative to a first blade on the subsequent impeller mounted on the shaft.

The hydrofoil impellers might have the same or different diameter. In an embodiment, the hydrofoil impellers have all the same diameter.

According to an embodiment, the ratio of the height of the reactor (H) to the diameter of the reactor (D) is between 1.5 and 4.0, or between 1.5 and 3.5, or even between 1.5 and 2.5.

The height and the diameter of the reactor as used herein refer to the internal height and internal diameter of the reactor, respectively.

In an embodiment, the ratio of the diameter of the reactor (D) to the diameter of each hydrofoil impeller (Da) is between 1.2 and 4.0, or between 1.5 and 3.5. In a particular embodiment, said ratio is between 1.2 and 2.5, or even between 1.6 and 2.0. In another embodiment, said ratio is between 2.0 and 4.0, or even between 2.9 and 3.3.

The hydrofoil impeller diameter is the distance between two opposite points on the outer periphery of the impeller.

According to an embodiment, the ratio of the axial distance between two successive hydrofoil impellers (G) and the diameter of the hydrofoil impellers (Da) is between 0.5 and 1.5, or between 0.5 and 1.2. In a particular embodiment, said ratio is between 0.6 and 1.0, or even between 0.7 and 0.9. In another embodiment, said ratio is between 0.8 and 1.2, or even between 0.9 and 1.1.

The axial distance between the hydrofoil impellers is the distance between the highest point in a blade of an impeller to the lowest point in a blade in the successively higher impeller.

When there are more than two hydrofoil impellers in the stirring system, the distance between each pair of hydrofoil impellers might be the same or different. Preferably, the axial distance between a hydrofoil impeller and the subsequent one is the same for all the hydrofoil impellers.

In an embodiment, the ratio of the blade length (L) to blade height (W) in each blade of each impeller is between 1.0 and 3.0, or between 1.2 and 2.5. In a particular embodiment, said ratio is between 1.2 and 1.8, or even between 1.4 and 1.6. In another embodiment, said ratio is between 1.5 and 2.5, or even between 1.8 and 2.2.

The blade height refers to the height of the blade according to the axial direction.

The blade length refers to the length of the blade according to the radial direction.

In an embodiment, the ratio of the hydrofoil impeller diameter (Da) to the blade height (W) is between 2.5 and 6.5, or between 3.0 and 6.0, or even between 3.5 and 5.5. In a particular embodiment, said ratio is between 3.5 and 4.5, or even between 3.9 and 4.3. In another embodiment, said ratio is between 4.5 and 5.5, or even between 4.8 and 5.2.

In an embodiment, the ratio of the hydrofoil impeller diameter (Da) to the blade length (L) is between 2.0 and 5.0, or between 2.0 and 4.0. In a particular embodiment, said ratio is between 2.0 and 2.5, or even between 2.0 and 2.2. In another embodiment, said ratio is between 3.0 and 4.0, or even between 3.2 and 3.6.

In an embodiment, the ratio between the distance from the bottom hydrofoil impeller to the internal bottom of the reactor (bottom clearance-h) and the hydrofoil impeller diameter (Da) is from 0.08 to 1.8, or from 0.1 to 1.2. In a particular embodiment, said ratio is between 0.1 and 0.3, or even between 0.15 and 0.2. In another embodiment, said ratio is between 0.5 and 1.5, or even between 0.8 and 1.2.

The distance from the bottom hydrofoil impeller to the internal bottom of the reactor, or bottom clearance, refers to the distance between the lowest point in the lower impeller to the lowest point in the reactor.

According to an embodiment, the tip speed of the hydrofoil impellers is between 2.5 and 10.0 m/s. In a particular embodiment, the tip speed is between 2.5 and 5.0 m/s, or even between 3.0 and 4.0 m/s, or even between 3.1 and 3.5 m/s. In another embodiment, the tip speed is between 5.0 and 10.0 m/s, or even between 6.5 and 8.5 m/s, or even between 7.0 and 7.6 m/s.

According to an embodiment, all the hydrofoil impellers are downward pumping, i.e. they direct a fluid flow toward the bottom of the reactor.

The speed of rotation of the impellers will be set as a function of the stirring system and reactor diameter according to good-practices well-known to the skilled person.

The speed of rotation of the impellers can vary in a broad domain; generally, the speed of rotation is advantageously at least 30 rpm, or at least 50 rpm or even at least 60 rpm. The speed of rotation of the impellers is advantageously at most 300 rpm, or at most 200 rpm or even at most 150 rpm.

In a particular embodiment, for a reactor having a diameter of from 500 to 3000 mm, the speed of rotation of the impellers is from 30 to 200 rpm, or from 50 to 150 rpm.

The reactor does not comprise baffles.

In an embodiment, the reactor is a continuous stirred tank reactor (CSTR).

In an embodiment, the reactor has a cylindrical shape.

In an embodiment, the reactor is pressurized. The term "pressurized" refers to a pressure that is greater than atmospheric pressure, such as a pressure greater than 1 bar, or greater than 1.5 bar, or greater than 2.0 bar.

The reactor may have a flat or a curved, e.g. ellipsoidal, shape bottom. In one embodiment, the reactor has a flat shaped bottom. In an embodiment, the reactor has an ellipsoidal shape bottom.

In an embodiment, the reactor comprises an inlet port located at the bottom of the reactor.

Hydrofoil impellers are well-known in the art. Examples of suitable hydrofoil impellers include, among others, impellers A310 and A310, A315, A320 and A340 from the company Lightnin, impellers XE-3, SC-3, HE-3 and Maxflo W from the company Chemineer, impellers MHS and LS from the company Philadelphia Mixers, impellers TT, TTP and TTP from the company Mixel, impeller TBF from the company Pfaudler, and impellers Isojet and Viscoprop-F from the company Ekato.

According to a particular embodiment of the invention, the stirring system comprises a shaft rotatable about its longitudinal axis and placed vertically in the reactor, and a plurality of, preferably 2-6, or even 3-5, radially extending hydrofoil impellers mounted on the shaft and respectively equally axially spaced apart, wherein the hydrofoil impellers are identical with each other.

In an embodiment, the stirring system comprises a shaft rotatable about its longitudinal axis and placed vertically in the reactor, and a plurality of, preferably 2-6, or even 3-5, radially extending hydrofoil impellers mounted on the shaft and respectively equally axially spaced apart, wherein the hydrofoil impellers are identical, wherein each hydrofoil impeller comprises a plurality of blades, preferably 2-6, or even 3-5, and wherein the angle the blades make with the plane of rotation is less than 90°, preferably less than 65°.

In an embodiment, the stirring system comprises a shaft rotatable about its longitudinal axis and placed vertically in the reactor, and three radially extending hydrofoil impellers mounted on the shaft and respectively equally axially spaced apart, wherein the hydrofoil impellers are identical, wherein each hydrofoil impeller comprises 3 blades and wherein the angle the blades make with the plane of rotation, the pitch, is decreasing from the range 40-55°, or even 40-50°, at the hub or the near-shaft region to the range 20-30°, or even 20-28°, at the tip. In a particular embodiment, this stirring system is used in a continuous process or method. In a further embodiment, the tip speed is 2.5-5.0 m/s, or even 3.0-4.0 m/s.

Particularly, in the method, (H)/(D) is 1.5-4.0, (D)/(Da) is 1.2-2.5, (G)/(Da) is 0.6-1.0, (L)/(W) is 1.5-2.5, (Da)/(W) is 3.5-4.5, (Da)/(L) is 2.0-2.5, and/or (h)/(Da) is 0.5-1.5.

In another embodiment, the stirring system comprises a shaft rotatable about its longitudinal axis and placed vertically in the reactor, and five radially extending hydrofoil impellers mounted on the shaft and respectively equally axially spaced apart, wherein the hydrofoil impellers are identical, wherein each hydrofoil impeller comprises 5 blades and wherein the angle the blades make with the plane of rotation, the pitch, is decreasing from the range 45-65°, or even 50-60°, at the hub or the near-shaft region to the range 25-40°, or even 28-38°, at the tip. In a particular embodiment, this stirring system is used in a semibatch process or method. In a further embodiment, the tip speed is 5.0-10.0 m/s, or even 6.5-8.5 m/s.

Particularly, in the method, (H)/(D) is 1.5-4.0, (D)/(Da) is 2.0-4.0, (G)/(Da) is 0.8-1.2, (L)/(W) is 1.2-1.8, (Da)/(W) is 4.5-5.5, (Da)/(L) is 3.0-4.0, and/or (h)/(Da) is 0.1-0.3.

Preferably, the blades within each hydrofoil impeller are identical with each other and are equally radially spaced apart, and the hydrofoil impellers in the stirring system are identical with each other and are equally axially spaced apart.

Base Polyol

The base polyol used in the method to prepare the polymer polyol may be any polyol known to be suitable as the liquid medium in polymer polyol systems. Accordingly, any polyol commercially available for polyurethane systems can in principle be used. The base polyol used may be the same as the polyol used for preparing the pre-formed stabilizer or the macromer, or may be a different polyol.

In an embodiment, the base polyol is a polyol having a hydroxyl functionality of at least 1, preferably at least 2, and more preferably more than or equal to 3. The functionality of the polyol is preferably less than or equal to 8, more preferably less than or equal to 6. In an embodiment, the base polyol is a polyol having a hydroxyl functionality from 2 to 8; preferably from 2 to 6; more preferably from 3 to 5.

In a particular embodiment, the base polyol has a molecular weight higher than 1.500 Da, preferably from 1.500 to 12.000 Da, more preferably from 2.000 to 6.000 Da.

Unless otherwise specified, the term "molecular weight" as used herein refers to the number average molecular weight. The number average molecular weight is determined by gel permeation chromatography. Preferably, molecular weight means the number average molecular weight as measured by gel permeation chromatography using polyethylene glycol as standard.

In a further embodiment, the base polyol has a hydroxyl number in the range from 10 to 400, preferably from 15 to 150, more preferably from 15 to 100, even more preferably from 20 to 75 mg KOH/g. The hydroxyl number of a polyol can be measured according to the ASTM D4274 method. As used herein, the hydroxyl number is defined as the number of milligrams of potassium hydroxide required for the complete hydrolysis of the fully phthalylated derivative prepared from 1 gram of polyol. The hydroxyl number can be also defined by the equation:

$$OH = (56.1 \times 1000 \times f)/\text{mol. wt},$$

wherein:

OH: represents the hydroxyl number of the polyol, f: represents the functionality of the polyol, i.e. the average number of hydroxyl groups per molecule of polyol, and mol. wt. represents the molecular weight of the polyol.

In an embodiment, the base polyol is a polyol having a hydroxyl functionality from 2 to 6, a molecular weight from 1.500 to 12.000 Da, and a hydroxyl number from 15 to 150 mg KOH/g.

In an embodiment, the base polyol is selected from a polyether polyol, a polyester polyol and a polycarbonate polyol, that is, a polyol as defined above having ether groups, ester groups or carbonate groups, respectively, within the polymer chain.

In a preferred embodiment, the base polyol is a polyether polyol also usually referred to as polyalkylene polyether polyol. In a preferred embodiment, the polyether polyol is the product of polymerization of alkylene oxides having from 2 to 4 carbon atoms (e.g. ethylene oxide, propylene oxide, butylene oxide and mixtures thereof) in the presence of a starting compound having at least one active hydrogen atom. Suitable starting compounds for the obtention of polyether polyols include, for example, polyhydroxyl compounds such as, ethylene glycol, propylene glycol, diethylene glycol, dipropylene glycol, tripropylene glycol, trimethylolpropane, glycerol, sorbitol, glucose and sucrose; water; ammonia; amino alcohols such as ethanolamine, diethanolamine, triethanolamine; and primary and/or secondary amine or polyamines such as ethylenediamine, aniline and toluene diamine. By alkoxylation of the starter, a suitable polyether polyol can be formed. The alkoxylation reaction may be catalysed using any conventional catalyst including, for example, potassium hydroxide or a double metal cyanide (DMC) catalyst.

Examples of suitable polyether polyols include polyoxyethylene glycols, triols, tetrols and higher functionality polyols; polyoxypropylene glycols, triols, tetrols and higher functionality polyols; and mixtures thereof. When ethylene oxide and propylene oxide mixtures are used to produce the polyether polyol, the ethylene oxide and propylene oxide may be added simultaneously or sequentially so that the polyether polyol has internal blocks, terminal blocks or a random distribution of oxyethylene groups and/or oxypropylene groups.

Other polyols suitable for use as the base polyol of the present invention include: alkylene oxide adducts of 1,3-dihydroxypropane, 1,3-dihydroxybutane, 1,4-dihydroxybutane, 1,4-, 1,5-, 1,6-dihydroxyhexane, 1,2-, 1,3-, 1,4-, 1,6-, 1,8-dihydroxyoctant, 1,10-dihydroxydecane, glycerol, 1,2,4-trihydroxybutane, 1,2,6-trihydroxyhexane, 1,1,1-trimethyl-olethane, 1,1,1-trimethylol propane, pentaerythritol, caprolactone, polycaprolactone, xylitol, arabitol, sorbitol, mannitol and the like.

Other polyols which can be used as a base polyol include the alkylene oxide adducts of non-reducing sugars, wherein the alkylene oxides have from 2 to 4 carbon atoms. Non-reducing sugars and sugar derivatives include sucrose, alkyl glycosides such as ethylene glycol glycoside, propylene glycol glucoside, glycerol glucoside, and 1,2,6-hexanetriol glucoside, as well as alkylene oxide adducts of the alkyl glycosides.

Other suitable polyols include the polyphenols and preferably alkylene oxides adducts thereof in which the alkylene oxides have from 2 to 4 carbon atoms. Among the suitable polyphenols are bisphenol A, bisphenol F, condensation products of phenol and formaldehyde, the novolac resins, condensation products of various phenolic compounds and acrolein, including the 1,1,3-tris(hydroxyl-phenyl)propanes, condensation products of various phenolic compounds and glyoxal, glutaraldehyde, and other dialdehydes, including the 1,1,2,2-tetrakis(hydroxyphenol)ethanes.

In an embodiment, the base polyol is a polyether polyol built up of propylene oxide and ethylene oxide units and preferably having a molecular weight from 2.000 to 12.000, preferably from 2.000 to 6.000, and a hydroxyl functionality from 2 to 6, preferably from 3 to 5. In an embodiment, the polyether polyol is a random or blocked propylene oxide-ethylene oxide copolymer with or without ethylene oxide terminal (cap) groups. In another embodiment, the polyether polyol is a propylene oxide polymer with ethylene oxide terminal groups.

In an embodiment, the base polyol is a glycerol initiated polyether polyol built up of propylene oxide and ethylene oxide units and having a number average molecular weight from 2.000 to 6.000. Preferably, said base polyol comprises 5-30 wt % of ethylene oxide, based on the weight of the monomers (propylene oxide+ethylene oxide monomers).

In an embodiment, the base polyol is a propylene oxide adduct of glycerine containing about 12 wt % random ethylene oxide, based on the weight of the monomers (propylene oxide+ethylene oxide monomers), with a hydroxyl number of about 55 mg KOH/g. In another embodiment, the base polyol is a propylene oxide adduct of glycerine containing an end-capping of about 19 wt % of ethylene oxide, based on the weight of the monomers (propylene oxide+ethylene oxide monomers), and with hydroxyl number of about 35 mg KOH/g.

Suitable polyester polyols that can be used as base polyol include those obtained from the condensation of one or more polyhydric alcohols, especially di- or trihydric alcohols, having from 2 to 15 carbon atoms with one or more polycarboxylic acids, especially dicarboxylic acids, having from 2 to 14 carbon atoms. Examples of suitable polyhydric alcohols include 1,2-ethanediol, ethylene glycol, propylene glycol such as 1,2-ethanediol, diethylene glycol, 1,2-propylene glycol and 1,3-propylene glycol, glycerol, neopentyl glycol, pentaerythritol, trimethylolpropane, 1,4,6-octanetriol, 1,4-butanediol, 1,5-pentanediol, 1,6-hexanediol, dodecanediol, octanediol, chloropentanediol, glycerol monallyl ether, glycerol monoethyl ether, diethylene glycol, 2-ethylhexanediol, 1,4-cyclohexanediol, 1,1,1-trimethylolpropane, 1,2,6-hexanetriol, 1,3,5-hexanetriol, 1,3-bis-(2-hydroxyethoxy) propane and the like. Examples of polycarboxylic acids include phthalic acid, isophthalic acid, terephthalic acid, tetrachlorophthalic acid, maleic acid, dodecylmaleic acid, octadecenylmaleic acid, fumaric acid, aconitic acid, trimellitic acid, 3,3'-thiodipropionic acid, succinic acid, adipic acid, trimethyladipic acid, malonic acid, glutaric acid, pimelic acid, sebacic acid, suberic acid, azelaic acid, maleic acid, fumaric acid, trimellitic acid, dodecanedicarboxylic acid, cyclohexane-1,2-dicarboxylic acid, 1,4-cyclohexadiene-1,2-dicarboxylic acid, 3-methyl-3,5-cyclohexadiene-1,2-dicarboxylic acid and the corresponding acid anhydrides, acid chlorides and acid esters such as phthalic anhydride, phthaloyl chloride and the dimethyl ester of phthalic acid. Particularly suitable are polyester polyols obtained from the condensation of a diol having from 2 to 15 carbon atoms with a dicarboxylic acid having from 2 to 14 carbon atoms.

Suitable polycarbonate polyols that can be used as base polyol include those obtained by reacting one or more polyhydric alcohols, especially di- or trihydric alcohols, having from 2 to 15 carbon atoms with one or more dialkyl carbonates, diaryl carbonates or phosgene. Examples of suitable polyhydric alcohols include 1,2-ethanediol, ethylene glycol, propylene glycol such as 1,2-ethanediol, diethylene glycol, 1,2-propylene glycol and 1,3-propylene glycol, glycerol, neopentyl glycol, pentaerythritol, trimethylolpropane, 1,4,6-octanetriol, 1,4-butanediol, 1,5-pentanediol, 1,6-hexanediol, dodecanediol, octanediol, chloropentanediol, glycerol monallyl ether, glycerol monoethyl ether, diethylene glycol, 2-ethylhexanediol, 1,4-cyclohexanediol, 1,1,1-trimethylolpropane, 1,2,6-hexanetriol, 1,3,5-hexanetriol, 1,3-bis-(2-hydroxyethoxy) propane and the like. Examples of suitable dialkyl carbonates and diaryl carbonates include dialkyl carbonates, diaryl carbonates having from 2 to 14 carbon atoms, such as dimethyl carbonate, diethyl carbonate, di-n-butyl carbonate, diphenyl carbonate and the like. Particularly suitable are polycarbonate polyols obtained from the condensation of a diol having from 2 to 15 carbon atoms with a dialkyl carbonate or diaryl carbonates having from 2 to 14 carbon atoms, or with phosgene.

The particular base polyol used will depend on the end use of the polyurethane foam to be produced. A mixture of various useful polyols can be used, if desired.

In a particular embodiment, the amount of base polyol used in the preparation of the polymer polyol is from 20 to 80 wt %, or from 30 to 70 wt %, based on the total weight of base polyol, ethylenically unsaturated monomer(s), macromer or preformed stabilizer, free-radical initiator and optional chain transfer agent. In a particular embodiment, the amount of base polyol used in the preparation of the polymer polyol is from 40 to 70 wt %, or from 45 to 65 wt %, based on the total weight of base polyol, ethylenically unsaturated monomer(s), macromer or preformed stabilizer, free-radical initiator and optional chain transfer agent.

Ethylenically Unsaturated Monomer

The terms "ethylenically unsaturated monomer" or "vinylic monomer" as used herein refer to a monomer containing ethylenic unsaturation (>C═C<, i.e. two double bonded carbon atoms) that is capable to undergoing free radically induced addition polymerization reactions.

Suitable ethylenically unsaturated monomers for preparing the polymer polyol and the pre-formed stabilizer include: aliphatic conjugated dienes such as butadiene and isoprene; monovinylidene aromatic monomers such as styrene, α-methylstyrene, butylstyrene, chlorostyrene, cyanostyrene and bromostryrene; α,β-ethylenically unsaturated carboxylic acids and esters thereof such as acrylic acid, methacrylic acid, methyl acrylate, methyl methacrylate, ethyl acrylate, 2-hydroxypropyl acrylate, 2-hydroxyethyl acrylate, butyl acrylate, isopropylmethacrylate, maleic acid, fumaric acid, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl) acrylamide and the like; vinyl esters such as vinyl acetate; vinyl ethers, vinyl ketones, vinyl and vinylidene halides; as well as any other ethylenically unsaturated material that is capable to undergoing free radically induced addition polymerization reactions. Mixtures of two or more of the above-mentioned monomers may also be employed. Monovinylidene aromatic monomers and ethylenically unsaturated nitriles are particularly preferred, even more preferably styrene (SM) and acrylonitrile (ACN).

In a preferred embodiment, the at least one ethylenically unsaturated monomer is a mixture of ethylenically unsaturated monomers, preferably a mixture of two monomers. Most preferable it is a mixture of styrene and acrylonitrile.

In an embodiment, the at least one ethylenically unsaturated monomer used in the preparation of the polymer polyol is a mixture of styrene and acrylonitrile in a weight ratio of from 88:12 (SM:ACN) to 20:80 (SM:ACN); preferably from 88:12 to 40:60. In a particular embodiment, the at least one ethylenically unsaturated monomer used in the preparation of the polymer polyol is a mixture of styrene and acrylonitrile in a weight ratio of from 88:12 (SM:ACN) to 50:50 (SM:ACN); or from 80:20 to 60:40. In a further embodiment, the at least one ethylenically unsaturated monomer used in the preparation of the polymer polyol is a mixture of styrene and acrylonitrile in a weight ratio of from 75:25 (SM:ACN) to 65:35 (SM:ACN).

In an embodiment, the amount of the at least one ethylenically unsaturated monomer used in the preparation of the polymer polyol is between 20 and 70 wt % based on the total weight of base polyol, ethylenically unsaturated monomer(s), macromer or preformed stabilizer, free-radical initiator and optionally chain transfer agent. In an embodiment, the amount of the at least one ethylenically unsaturated monomer used in the preparation of the polymer polyol is between 30 and 60 wt %, or between 35 and 55 wt %, based on the total weight of base polyol, ethylenically unsaturated monomer(s), macromer or preformed stabilizer, free-radical initiator and optionally chain transfer agent.

Radical Initiator

Initiation of the polymerization to prepare the polymer polyol can be accomplished using conventional free-radical initiators which are known in the art. Suitable free-radical initiators for the preparation of the polymer polyol include alkyl and aryl peroxides, alkyl and aryl hydroperoxides, acyl peroxides, peroxyesters, persulfates, perborates, percarbonates and azo compounds. Some specific examples include hydrogen peroxide, dibenzoyl peroxide, didecanoyl peroxide, dilauroyl peroxide, t-butyl hydroperoxide, benzoyl peroxide, di-t-butyl peroxide, di(3,5,5-trimethylhexanoyl) peroxide, diisobutyryl peroxide, t-butylperoxy diethyl acetate, t-butyl peroctoate, t-butyl peroxy isobutyrate, t-butyl peroxy 3,5,5-trimethyl hexanoate, t-butyl perbenzoate, t-butyl peroxy pivalate, t-butyl peroxy-2-ethyl hexanoate, tert-amyl peroxy-2-ethylhexanoate, 1,1,3,3-tetramethylbutyl peroxy-2-ethylhexanoate, cumene hydroperoxide, azobis(isobutyronitrile) and 2,2'-azo bis-(2-methylbutyronitrile).

Among the useful initiators are those having a satisfactory half-life within the temperature ranges used in the polymerization reaction, i.e., the half-life should be about 25% or less of the residence time in the reactor at any given time. Suitable initiators include acyl peroxides such as didecanoyl peroxide, lauroyl peroxide, diisobutyryl peroxide and di(3,5,5-trimethylhexanoyl) peroxide, peroxyesters such as tert-amyl peroxy-2-ethylhexanoate, 1,1,3,3-tetramethylbutyl peroxy-2-ethylhexanoate, hydroperoxides such as cumene hydroperoxide, and azo compounds such as azobis(isobutyronitrile) and 2,2'-azo bis-(2-methylbutyronitrile).

In a particular embodiment, the amount of the free-radical initiator used to prepare the polymer polyol is from 0.05 to 3 wt %, or from 0.1 to 2 wt %, or even from 0.2 to 2 wt %, based on the total weight of base polyol, ethylenically unsaturated monomer(s), macromer or preformed stabilizer, free-radical initiator and the optional chain transfer agent.

Macromer

The macromer can be used in the method of the invention either to prepare the preformed stabilizer or to generate the stabilizer in situ.

Suitable macromers and processes for their preparation are well known in the art (e.g. U.S. Pat. No. 4,454,255). The term "macromer" or "macromonomer" refers to a molecule which comprises one or more polymerizable double bonds able to copolymerize with ethylenically unsaturated monomers such as styrene and acrylonitrile and which may comprise one or more hydroxyl-terminated polyether chains. Typical macromers include polyols, preferably polyether polyols, having an unsaturated group, which are commonly manufactured by reacting a polyol with an organic compound containing an unsaturated group and a carboxyl, anhydride, isocyanate, epoxy or other functional group able to react with active hydrogen-containing groups.

In a particular embodiment, the macromer is prepared by the reaction of a polyol, either directly or indirectly (e.g. by previous reaction of the polyol with a diisocyanate, such as TDI), with an unsaturated compound. More specifically, an unsaturated compound selected from maleic anhydride, fumaric acid, dialkyl fumarates, dialkyl maleates, glycol fumarates, glycol maleates, 3-isopropenyl dimethyl benzyl isocyanate, isocyanatoethyl methacrylate, isocyanatoethyl ethylmethacrylate, isocyanatoethyl methylmethacrylate, 2-butene-1,4-diol, 1-butene-3,4-diol, hydroxymethyl methacrylate, hydroxypropyl acrylate, hydroxyethyl methacrylate, methyl methacrylate, acrylic acid, methacrylic acid, acrylic anhydride, methacrylic anhydride, methacroyl chloride, glycidyl methacrylate and allyl glycidyl ether. In a preferred embodiment, the macromer is the reaction product of a polyol with maleic anhydride (MA) or 3-isopropenyl dimethyl benzyl isocyanate (mTMI). Optionally, the polyol used to prepare the macromer may be obtained by linkage of polyols through coupling with a compound such as a polyisocyanate (e.g. tolylene diisocyanate (TDI), diphenylmethane-4,4'-diisocyanate (MDI), hexamethylene disisocyanate (HMDI)) to produce a high molecular weight polyol, which is then reacted with the unsaturated compound.

In the preparation of the macromer, it is preferred that the quantity of the reactive unsaturated compound used is in the range of from 0.3 to 10.0 moles per mol of polyol, or even from 0.5 to 4.0 moles per mol of polyol. In an embodiment the quantity of the reactive unsaturated compound used is in the range of from 0.5 to 2.0 moles per mol of polyol, or even from 0.5 to 1.5 moles per mol of polyol.

In embodiment, the reactive unsaturated compound used is maleic anhydride. In another embodiment, the reactive unsaturated compound used is 3-isopropenyl dimethyl benzyl isocyanate.

The polyol used for preparing the macromer may be selected from a polyether polyol, a polyester polyol or a polycarbonate polyol. Suitable polyether polyols, polyester polyols and polycarbonate polyols are as defined herein in relation to the base polyol. In a preferred embodiment, it is a polyether polyol. More preferably, it is selected from a polyoxyalkylene polyether polyol as defined above in relation to the base polyol.

In an embodiment, the polyol used for preparing the macromer is a polyether polyol obtained by polymerization of alkylene oxides having from 2 to 4 carbon atoms (e.g. ethylene oxide, propylene oxide, butylene oxide and mixtures thereof) in the presence of a starting compound having at least one active hydrogen atom, preferably 2-6 active hydrogen atoms.

In an embodiment, the polyol is a polyether polyol built up of propylene oxide and ethylene oxide units and preferably having a molecular weight from 1500 to 14000, or from 3000 to 13000, and a hydroxyl functionality from 2 to 6, more preferably from 3 to 6. In an embodiment, the polyether polyol is a random or blocked propylene oxide-ethylene oxide copolymer with or without ethylene oxide terminal (cap) groups. In another embodiment, the polyether polyol is a propylene oxide polymer with ethylene oxide terminal groups.

In an embodiment, the polyol is a glycerol or sorbitol initiated polyether polyol built up of propylene oxide and ethylene oxide units and having a hydroxyl number from 20 to 45 mg KOH/g. Preferably, said base polyol comprises 5-30 wt %, or even 10-20 wt %, of ethylene oxide, based on the weight of the monomers (propylene oxide+ethylene oxide monomers).

Stabilizer

In the present document, the terms "dispersant" and "stabilizer" are used indistinctly. Dispersants or stabilizers are typically employed in the preparation of polymer polyols to stabilize the dispersion of polymers resulting from polymerization of the ethylenically unsaturated monomers in the polyol phase. Therefore, in the present invention either a macromer (if the stabilizer is formed in situ) or a preformed stabilizer might be added to the reactor where the polymer polyol is prepared.

In an embodiment, the stabilizer or dispersant is generated "in situ" by adding a macromer to the reactor.

In a particular embodiment, when the stabilizer is generated in situ, the macromer in the method for preparing the polymer polyol is used in an amount from 0.5 to 20 wt %, or from 1 to 10 wt %, based on the total weight of base polyol, ethylenically unsaturated monomer(s), macromer or preformed stabilizer, free-radical initiator and the optional chain transfer agent. In an embodiment, the amount of macromer is from 1 to 5 wt % based on the total weight of base polyol, ethylenically unsaturated monomer(s), macromer or preformed stabilizer, free-radical initiator and the optional chain transfer agent.

In another embodiment, a pre-formed stabilizer or dispersant is used. That is, a stabilizer or dispersant is previously formed and then added to the reactor where the polymer polyol is prepared.

Pre-formed stabilizers and processes for their preparation are well known in the art. The term pre-formed stabilizer is defined as an intermediate obtained by reacting a macromer with at least one ethylenically unsaturated monomer (e.g. acrylonitrile, styrene, methylmethacrylate, etc.), optionally with a chain transfer agent and optionally in a diluent (e.g. methanol, isopropanol, toluene, ethylbenzene, polyether polyols, etc.) in the presence of a free-radical initiator to give a copolymer (dispersion having low solids content, e.g. <20 wt %, such as from 3 to 15 wt %). The resulting dispersant allows the stabilization of the solid particles of the polymer polyol. Suitable preformed stabilizers include those known in the art.

Suitable macromers for the preparation of the preformed stabilizer are as defined herein. In a particular embodiment, the macromer used in the preparation of the preformed stabilizer is in an amount from 10 to 60 wt %, preferably from 15 to 50 wt %, more preferably from 15 to 40 wt % based on the total weight of the components used to prepare the preformed stabilizer (i.e. 100% by weight of the combined weight of the macromer, the ethylenically unsaturated monomer(s), the free-radical initiator and the optional diluent and/or the optional chain transfer agent).

Suitable ethylenically unsaturated monomers for preparing the preformed stabilizer are as defined above in relation to the preparation of the polymer polyol. In a particular embodiment, the at least one ethylenically unsaturated monomer for preparing the preformed stabilizer is a mixture of at least two ethylenically unsaturated monomers as defined herein, preferably a mixture of styrene and acrylonitrile. These monomers are typically used in weight ratios of from 88:12 (SM:ACN) to 20:80 (SM:ACN). In a particular embodiment, the weight ratio of SM:ACN is from 88:12 to 40:60; or from 88:12 to 50:50. In an embodiment, the amount of the at least one ethylenically unsaturated monomer used for the preparation of the pre-formed stabilizer may vary between 3 and 30 wt % based on the total weight of the components used to prepare the pre-formed stabilizer. In an embodiment, the amount of the at least one ethylenically unsaturated monomer used for the preparation of the pre-formed stabilizer is between 5 and 25 wt %, or between 5 and 20 wt % based on total weight of the components used to prepare the pre-formed stabilizer.

Initiation of the polymerization to prepare the preformed stabilizer can be accomplished using conventional free-radical initiators which are known in the art. Suitable free-radical initiators for the preformed stabilizer include alkyl and aryl peroxides, alkyl and aryl hydroperoxides, acyl peroxides, peroxyesters, persulfates, perborates, percarbonates and azo compounds. Some specific examples include hydrogen peroxide, dibenzoyl peroxide, didecanoyl peroxide, dilauroyl peroxide, t-butyl hydroperoxide, benzoyl peroxide, di-t-butyl peroxide, di(3,5,5-trimethylhexanoyl) peroxide, diisobutyryl peroxide, t-butylperoxy diethyl acetate, t-butyl peroctoate, t-butyl peroxy isobutyrate, t-butyl peroxy 3,5,5-trimethyl hexanoate, t-butyl perbenzoate, t-butyl peroxy pivalate, t-butyl peroxy-2-ethyl hexanoate, tert-amyl peroxy-2-ethylhexanoate, (1,1,3,3-tetramethylbutyl peroxy-2-ethylhexanoate), cumene hydroperoxide, azobis(isobutyronitrile) and 2,2'-azo bis-(2-methylbutyronitrile). Among the useful initiators, preferably are those having a satisfactory half-life within the temperature ranges used in the polymerization reaction, i.e., the half-life should be about 25% or less of the residence time in the reactor at any given time. Preferred initiators include acyl peroxides such as didecanoyl peroxide, lauroyl peroxide, diisobutyryl peroxide and di(3,5,5-trimethylhexanoyl) peroxide, peroxyesters such as tert-amyl peroxy-2-ethylhexanoate, 1,1,3,3-tetramethylbutyl peroxy-2-ethylhexanoate, and azo compounds such as azobis(isobutyronitrile) and 2,2'-azo bis-(2-methylbutyronitrile). In a particular embodiment, the free-radical initiator used to prepare the preformed stabilizer is in an amount from 0.01 to 2 wt %, preferably from 0.05 to 1 wt %, more preferably from 0.1 to 1 wt %, based on the total weight of reactants used in the preparation of the preformed stabilizer (macromer, ethylenically unsaturated monomer(s), free-radical polymerization initiator and the optional chain transfer agent and/or diluent).

Suitable diluents for the preparation of the preformed stabilizer include, for example, compounds such as mono-ols (i.e., monohydroxy alcohols), polyols, hydrocarbons, ethers etc., and mixtures thereof. Suitable mono-ols include alcohols which contain at least one carbon atom, preferably from 1 to 6 carbon atoms (C1-6) such as, for example, methanol, ethanol, n-propanol, isopropanol, n-butanol, sec.-butanol, tert-butanol, n-pentanol, 2-pentanol, 3-pentanol, etc. and mixtures thereof. A preferred mono-ol is isopropanol. In a particular embodiment, the diluent used for the preparation of the preformed stabilizer is in an amount from 0 to 85 wt %, or from 10 to 85 wt %, based on the total weight of reactants used in the preparation of the preformed stabilizer (macromer, ethylenically unsaturated monomer(s), free-radical polymerization initiator and optional chain transfer agent and/or diluent). In an embodiment, it is used in an amount from 10 to 75 wt %, or from 20 to 70 wt %, based on the total weight of reactants used in the preparation of the preformed stabilizer.

Chain transfer agents may also be used in the preparation of the preformed stabilizer. The use of chain transfer agents and their nature is known in the art. They are also commonly referred to as polymer control agents or molecular weight regulators since they are employed to control the molecular weight of the copolymerizate. Suitable chain transfer agents include mercaptans (e.g. dodecanethiol, ethanethiol, 1-heptanethiol, 2-octanethiol and toluenethiol), alkyl halides (carbon tetrachloride, carbon tetrabromide, chloroform, methylene chloride), alcohols (e.g. isopropanol, ethanol, tert-butanol, methanol), toluene, ethylbenzene, trimethylamine, water, cyclohexane, terpinolene. In a particular embodiment, the chain transfer agent used for the preparation of the preformed stabilizer is in an amount from 0 to 6.0 wt %, or from 0.1 to 6 wt %, based on the total weight of reactants used in the preparation of the preformed stabilizer (macromer, ethylenically unsaturated monomer(s), free-radical polymerization initiator and optional chain transfer agent and/or diluent).

The temperature in which the reaction for preparing the preformed stabilizer takes place should be selected to allow the thermal decomposition of the free-radical initiator leading to free-radicals that enable initiating the polymerization of the ethylenically unsaturated monomer(s). In a particular embodiment, this reaction is carried out at a temperature of at least 100° C., preferably from 100 to 140° C.

In a particular embodiment of the invention, the pressure in the method for preparing the preformed stabilizer is at least 3.5 bar, preferably from 4 to 6 bar. In a particular embodiment of the invention, the residence time in the method for preparing the preformed stabilizer is at least 20 minutes, preferably from 25 to 90 minutes.

The preformed stabilizer that might be used in the method for preparing the polymer polyol of the present invention is a mixture comprising the preformed stabilizer optionally dispersed in the diluent and/or chain transfer agent together with any unreacted monomer.

In a particular embodiment of the invention, the preformed stabilizer is used in the preparation of the polymer polyol in an amount from 1 to 25 wt %, or from 2 to 20 wt % based on the total weight of base polyol, ethylenically unsaturated monomer(s), macromer or preformed stabilizer, free-radical initiator and optionally chain transfer agent.

Chain Transfer Agent

In a particular embodiment, the method of the invention for preparing a polymer polyol comprises the addition of a chain transfer agent.

Chain transfer agents are known in the art. Suitable chain transfer agents include, for example, mercaptans (e.g. dodecanethiol, ethanethiol, 1-heptanethiol, 2-octanethiol and toluenethiol), alkyl halides (carbon tetrachloride, carbon tetrabromide, chloroform, methylene chloride), alcohols (e.g. isopropanol, ethanol, tert-butanol, methanol), toluene, ethylbenzene, trimethylamine, water, cyclohexane, terpinolene. In a particular embodiment, the chain transfer agent is terpinolene. In a particular embodiment, the chain transfer agent is used in the method for preparing the polymer polyol in an amount from 0 to 8.0 wt %, preferably from 0 to 6.0 wt % based on the total weight of base polyol, ethylenically unsaturated monomer(s), macromer or preformed stabilizer, free-radical initiator and the optional chain transfer agent. In an embodiment, it is used in an amount from 0.05 to 6.0 wt %, or from 0.1 to 3.0 wt % based on the total weight of base polyol, ethylenically unsaturated monomer(s), macromer or preformed stabilizer, free-radical initiator and the optional chain transfer agent.

In particular embodiments of the method of the invention:
 the amount of the base polyol is 20-80 wt %, preferably 40-70 wt %; and/or
 the amount of the at least one ethylenically unsaturated monomer is 20-70 wt %, preferably 30-60 wt %; and/or
 the amount of the macromer is 0.5-20 wt %, preferably 1-10 wt %; and/or
 the amount of the preformed stabilizer is 1-25 wt %, preferably 2-20 wt %; and/or
 the amount of the free-radical initiator is 0.05-3 wt %, preferably 0.1-2 wt %; and/or
 the amount of the chain transfer agent is 0-8.0 wt %, preferably 0.05-6.0 wt %;
based on the total weight of base polyol, at least one ethylenically unsaturated monomer, macromer or preformed stabilizer, free-radical initiator and the optional chain transfer agent.

Method for Preparing the Polymer Polyol

The temperature of the method should be selected to allow the thermal decomposition of the radical initiator, leading to free-radicals that enable initiating the polymerization of the ethylenically unsaturated monomer(s).

In a particular embodiment, the method of the invention is carried out at a temperature of at least 100° C., such as from 100 to 140° C. In an embodiment, the method is carried out at a temperature from 110° C. to 140° C., or from 120° C. to 135° C.

In a particular embodiment of the invention, the residence time in the reactor is at least 20 minutes, preferably from 20 to 240 minutes, or from 20 to 120 minutes.

In an embodiment, the method of the invention can be carried out at a pressure from 2 to 6 bar, or from 2 to 4 bar, or even from 2.5 to 3.5 bar.

The method of the invention includes both separate introduction of each of the reagents, or of some of them, into the reactor, and prior combination of all or of some of the reagents into a single stream for their combined introduction into the reactor.

The method of the invention can be performed as a batch, semibatch or continuous process.

In a particular embodiment, the reagents, or at least part of the reagents, are fed from the bottom of the reactor, i.e. through an inlet port located at the bottom wall of the reactor.

In a particular embodiment, the method of the invention is a continuous or a semibatch process, where all (continuous process) or part (semibatch process) of the reagents are fed continuously to the reactor. In a preferred embodiment, the continuous feed is added from the bottom of the reactor. The initial load in the semibatch process can be added form the top, bottom or lateral wall of the reactor.

According to an embodiment, at least the free-radical initiator, the at least one ethylenically unsaturated monomer, the chain transfer agent (if used) and part of the base polyol are fed from the bottom of the reactor. In a further embodiment, the base polyol, the macromer or the preformed stabilizer, the at least one ethylenically unsaturated monomer, the free-radical initiator and the optional chain transfer agent are fed from the bottom of the reactor.

In a particular embodiment, the method for preparing the polymer polyol is a semi-batch process. Thus, in an embodiment, part of the reaction components or reagents are charged into the reactor (initial load) and then the remaining reaction components or reagents are added to the reactor at a given rate (continuous feed).

In an embodiment, the initial load comprises part of the base polyol (eg 10 to 90 wt % with respect to the total weight of base polyol, eg 40 to 90 wt % or even 60 to 90 wt %) and the continuous feed comprises the at least one ethylenically unsaturated monomer, the macromer or preformed stabilizer, the free-radical initiator, the chain transfer agent (if used) and the remainder of the base polyol (eg 10 to 90 wt %, eg 10 to 60 wt % or even 10 to 40 wt %). In another embodiment, the initial load comprises the macromer or preformed stabilizer and part of the base polyol (eg 10 to 90 wt % with respect to the total weight of base polyol, eg 40 to 90 wt % or even 60 to 90 wt %) and the continuous feed comprises the least one ethylenically unsaturated monomer, the free-radical initiator, the chain transfer agent (if used) and the remainder of the base polyol (eg 10 to 90 wt %, eg 10 to 60 wt % or even 10 to 40 wt %). In another embodiment, the initial load comprises part of the macromer or preformed stabilizer (eg 10 to 90 wt % with respect to the total weight of the macromer or preformed stabilizer) and part of the base polyol (eg 10 to 90 wt % with respect to the total weight of base polyol, eg 40 to 90 wt % or even 60 to 90 wt %) and the continuous feed comprises the least one ethylenically unsaturated monomer, the free-radical initiator, the chain transfer agent (if used), the remainder of the base polyol (eg 10 to 90 wt %, eg 10 to 60 wt % or even 10 to 40 wt %), and the remainder of the macromer or preformed stabilizer (eg 10 to 90 wt % with respect to the total weight of the macromer or preformed stabilizer). Preferably, the initial load is heated to the reaction temperature before addition of the continuous feed.

The reaction components or reagents in the continuous feed can be added together to the reactor, or each of them or mixtures thereof can be added separately to the reactor. In a particular embodiment, the components in the continuous feed are fed together to the reactor.

In a particular embodiment, at least the continuous feed is added from the bottom of the reactor.

According to an embodiment, the addition time of the continuous feed is 40-240 min, or even 60-120 min. In a further embodiment, it is 80-100 min.

After completion of the addition of the continuous feed, the reaction can be maintained in the reactor for 20 to 120 minutes, or from 20 to 60 minutes. Then, volatiles might be removed, for example under vacuum using nitrogen as stripping gas.

In another particular embodiment, the method to produce the polymer polyol is a continuous process. In this case, all the reaction components or reagents can be continuously fed into a continuously stirred tank reactor (CSTR). In an embodiment the reaction mixture resides for a given time at a given pressure and temperature in said reactor, and then can be transferred to a degassing process.

According to an embodiment of the continuous process, the residence time is 20-120 min, or even 25-60 min. In a further embodiment, the reaction temperatures is 100-140° C., or even 120° C.-130° C. In an embodiment, the reaction pressure is 2-4 bar, or even 2.5-3.5 bar.

In an embodiment, the reactor is operated liquid full and the resulting product exits from the top of the reactor (for example, through an outlet port at the top of the reactor).

Additionally, the polymer polyol can be prepared in a two-stage reactor system wherein all the reactants are continuously introduced and the product is withdrawn proportionately through an overflow. In an embodiment, said reactor system comprises two stirred-tank reactors connected in series. More particularly, the two-stage reactor can comprise a first stage, continuously stirred tank reactor where feed streams are introduced and a second reactor, where the outlet from the first stage reactor is fed. The reactor is normally operated liquid full, and the temperature controlled. Pressure of the two-stage reactor system can be controlled at a desired value by means of a back pressure control valve placed for example at the second stage reactor outlet stream. The outlet from the first stage reactor is fed to a second stage reactor. In this case, most of the polymerization reaction generally occurs at the first reactor (usually 80-90% of the total process conversion), and the second reactor is used to increase reaction conversion.

In an embodiment of the continuous process, all the reaction components or reagents, such as the base polyol, the at least one ethylenically unsaturated monomer, the macromer or preformed stabilizer, the free-radical initiator and the chain transfer agent (if used), are combined into a single stream and fed to the (first) reactor.

In a particular embodiment, the reaction components or reagents in the continuous process are fed from the bottom of the reactor.

After reaction of the components for preparing the polymer polyol according to the method of the invention, the volatile components (e.g. residual monomers and free radical initiator decomposition products) can be removed by vacuum flash evaporation and stripping. Such stripping can be suitably carried out by heating to a temperature in the range of from 100 to 150° C. with stirring and application of vacuum and/or of steam or nitrogen stripping.

The resultant polymer polyols obtainable by the method of the invention exhibit a good combination of properties, in particular an adequate particle size, particle size distribution, high solids content while low viscosity, making them very suitable for its processability in the synthesis of polyurethane foams.

In an embodiment, the method of the invention leads to a polymer polyol with a solid content from 30 to 65 wt % based on the total weight of the resultant polymer polyol. In a particular embodiment, the solids content of the polymer polyols ranges from 35 to 50 wt %, based on the total weight of the polymer polyol. The solid content refers to the polymer resulting from at least one ethylenically unsaturated monomer that is dispersed in the base polyol. The resulting polymer polyols can be diluted to the desired solids content value.

In an embodiment, the polymer polyol of the invention has low viscosity, preferably less than 20000 cp, or even less than 8000 cp.

Polymer polyols with very narrow particle size distribution (span) can be obtained by using the method of the invention. In an embodiment, the span of the particle size distribution in the polymer polyol of the invention is equal or less than 3, or equal or less than 2.5, or even equal or less than 2. In a particular embodiment, the span of the particle size distribution is from 1 to 3, or from 1 to 2.5, or even from 1 to 2.

The polymer polyols prepared by the method of the present invention are particularly useful for the production of polyurethanes, preferably polyurethane foams, which are prepared by reacting the resulting polymer polyol with a polyisocyanate, optionally in the presence of further additives for the preparation of polyurethanes, such as additional polyols, chain transfer agents, catalysts, stabilizers, blowing agents, flame retardants, fillers and/or pigments. Suitable methods for the preparation of polyurethanes are well known in the art.

Therefore, in an embodiment, the method of the invention further comprises a step of preparing a polyurethane, preferably a foam, with the resulting polymer polyol, e.g. by reacting the resulting polymer polyol with a polyisocyanate.

The invention is illustrated by means of the following examples, which in no case limit the scope of the invention.

EXAMPLES

Methods

Styrene polymer content of the polymer polyol was determined by means of H-NMR (Bruker AV500, USA), in deuterated acetone.

Acrylonitrile polymer content of the polymer polyol was determined by means of Nitrogen Kjeldhal analysis.

Solids content of the polymer polyol was calculated by adding styrene and acrylonitrile polymer content values (not including stabilizer and unreacted ethylenically unsaturated monomers).

Viscosities disclosed therein are determined at 25° C. The viscosity is determined according to EN ISO 3219 at 25° C. and 25 s−1. Viscosity measurements (in mPa·s) can be obtained employing a Haake iQ viscotester rheometer using the spindle CC25DIN/Ti.

Particle size (D10, D50, D90) was determined by static laser diffraction using a Mastersizer 3000 equipment dispersing the sample in ethanol and calculating the particle size distribution using Fraunhofer theory.

The span of the particle size distribution was calculated as (D90-D10)/D50, wherein D10, D50 and D90 means the particle size at which 10%, 50% or 90%, respectively, of the total volume of the particles is contained (i.e. 10%, 50% or 90%, respectively, volume of the particles present a particle size within said value). D10, D50 and D90 means can be determined by laser diffraction; for example, as mentioned above for the particle size.

Reaction conversion, X (%), was calculated as follows:

$$X(\%) = \frac{\text{Solids (wt \%)} \times (100 - \text{Initiator (wt \%)} - CTA(\text{wt \%}) - SM(\text{wt \%}) - ACN(\text{wt \%}))}{(1 - \text{Solids (wt \%)}/100) \times (SM(\text{wt \%}) + ACN(\text{wt \%}))}$$

where:

Solids (wt %), represents the solids content obtained in the stripped product expressed in weight percentage.

Initiator (wt %), CTA (wt %), SM (wt %) and ACN (wt %), represents the radical initiator, chain transfer agent, styrene monomer and acrylonitrile monomer contents, respectively, fed to the process, expressed in weight percentages.

Materials

Base Polyol A: propylene oxide adduct of glycerine containing about 12 wt % random ethylene oxide, based on the total weight of the ethylene oxide and propylene oxide monomers (i.e. OE/(OE+OP), with a hydroxyl number of about 55 mg KOH/g and a viscosity of 490 mPa·s. It is available under the name Alcupol® F-5511 from Repsol Química.

Base Polyol B: propylene oxide adduct of glycerine containing about 19 wt % ethylene oxide cap, based on the total weight of the ethylene oxide and propylene oxide monomers (i.e. OE/(OE+OP), with hydroxyl number of about 35 mg KOH/g and a viscosity of 835 mPa·s. It is commercially available under the name Alcupol® F-3541 from Repsol Química.

CTA (chain transfer agent): Terpinolene.

SM: Styrene Monomer

ACN: Acrylonitrile Monomer.

Initiator A: 1,1,3,3-tetramethylbutyl peroxy-2-ethylhexanoate (free-radical initiator commercially available as Trigonox® 421 from Nouryon).

Initiator B: tert-amyl peroxy-2-ethylhexanoate (free-radical initiator commercially available as Peroxan APO from Pergan).

Macromer A: propylene oxide adduct of sorbitol containing 16 wt % ethylene oxide cap, based on the total weight of the ethylene oxide and propylene oxide monomers (i.e. OE/(OE+OP), with hydroxyl number of 29 mg KOH/g (polyol). This macromer was prepared by reacting, under heating at 90° C., the polyol with 1.2 moles of isopropenyl dimethyl benzyl isocyanate (sold as TMI® (META) by Allnex) per mole of polyol in the presence of 300 ppmw of tin (II) 2-ethylhexanoate as catalyst for 3 hours under nitrogen atmosphere, resulting in a molecule containing polymerizable carbon-carbon double bonds.

Macromer B: it was prepared by heating a propylene oxide adduct of glycerine containing 13 wt % ethylene oxide cap, based on the total weight of the ethylene oxide and propylene oxide monomers (i.e. OE/(OE+OP), with hydroxyl number of 35 mg KOH/g (polyol) with 1.6 parts by weight of maleic anhydride per part of polyol and 0.01 parts by weight of calcium (II) 2-ethylhexanoate catalyst per part of polyol at 145° C. for about 1 hour in a nitrogen atmosphere obtaining an intermediate product. This intermediate product was subsequently reacted with 0.06 parts by weight of propylene oxide per part of polyol at 145° C. for 4 hours. Volatiles were stripped off at 110° C. under vacuum using nitrogen as stripping gas, resulting in a molecule containing 0.75 polymerizable carbon-carbon double bonds per mole of polyol.

The following abbreviations are used:

H: reactor height.

D: reactor diameter.

Da: hydrofoil impeller diameter.

W: blade height.

L: blade length.

G: hydrofoil impeller clearance.

h: bottom clearance.

Ha: baffle height.

J: baffle width.

General Process for the Semibatch Polymer Polyol Synthesis

In an autoclave reactor, part of the base polyol and the macromer (all of it) was loaded, the reactor was closed, purged with nitrogen, left to slight overpressure under nitrogen atmosphere (+0.8 barg), and heated under stirring to reaction temperature. Then, a solution composed of the monomers, free-radical initiator, chain transfer agent and the rest of the base polyol, was fed at room temperature and at a constant flow rate from the bottom of the reactor during a period of time. During the reaction, temperature was controlled at reaction temperature. Vapor outlet from reactor was closed, so reaction pressure increases as liquid level rises to a maximum of 3 barg. Polymerization was continued for 30 minutes after completion of monomer(s) addition at the same reaction temperature. Then, volatiles were removed under vacuum using nitrogen as stripping gas for 2 hours and 130° C. Once the stripping of the reaction product was finished, it was cooled and discharged from the reactor for further analysis.

|  | Comp. Ex 1-3 and Ex. 6 | Comp. Ex 4-5 |
|---|---|---|
| Batch Load |  |  |
| Polyol B (% wt) | 44.6 | 43.8 |
| Macromer (% wt) | 2.0 | 2.8 |
| Macromer Type | A | B |
| Semibatch Load |  |  |
| ACN (% wt) | 13.8 | 9.4 |
| SM (% wt) | 27.5 | 25.5 |
| Polyol B (% wt) | 10.6 | 17.5 |
| CTA (% wt) | 1.25 | 0.43 |
| Initiator (% wt) | 0.31 | 0.52 |
| Initiator type | B | A |
| Reaction Temperature ° C. | 130 | 125 |
| Semibatch addition time (min) | 90 | 110 |

This process was performed in reactors with the following configurations:

| Example | 1 (comparative) | 2 (comparative) | 3, 4 (comparative) | 5 (comparative) | 6 |
|---|---|---|---|---|---|
| H/D | 2.1 | 2.1 | 2.4 | 1.8 | 1.7 |
| Lower Impeller |  |  |  |  |  |
| Impeller type | 30° pitched blade × 4; 90° | Flatblade × 6; 60° (Rushton) | Flatblade × 6; 60° (Rushton) | Straight blade | Hydrofoil (×5) |
| Tip speed (m/s) | 2.51 | 2.51 | 2.83 | 1.57 | 7.29 |
| Da/W | 5.0 | 5.0 | 4.6 | 4.3 | 5.0 |
| Da/L | 3.3 | 4.0 | 3.2 | 2.9 | 3.4 |
| D/Da | 2.7 | 2.7 | 1.8 | 2.2 | 3.1 |
| h/Da | 0.5 | 0.5 | 0.6 | 0.5 | 0.18 |
| Intermediate Impeller |  |  |  |  |  |
| Impeller type | 30° pitched blade × 4; 90° | 30° pitched blade × 4, 90° | Flatblade × 6; 60° (Rushton) |  | 3 Hydrofoil (×5) |
| Tip speed (m/s) | 2.51 | 2.51 | 2.83 |  | 7.29 |
| Da/W | 5.0 | 5.0 | 4.6 |  | 5.0 |
| Da/L | 3.3 | 3.3 | 3.2 |  | 3.4 |
| D/Da | 2.7 | 2.7 | 1.8 |  | 3.1 |
| G/Da | 1.0 | 1.0 | 1.3 |  | 1.0 |
| Upper Impeller |  |  |  |  |  |
| Impeller type | 30° pitched blade × 4; 90° | Flatblade × 6; 60° (Rushton) | Flatblade × 6; 60° (Rushton) | Straight blade | Hydrofoil (×5) |
| Tip speed (m/s) | 2.51 | 2.51 | 2.83 | 2.21 | 7.29 |
| Da/W | 5.0 | 5.0 | 4.6 | 1.4 | 5.0 |
| Da/L | 3.3 | 4.0 | 3.2 | 2.7 | 3.4 |
| D/Da | 2.7 | 2.7 | 1.8 | 1.6 | 3.1 |
| G/Da | 1.0 | 1.0 | 1.3 | 0.1-0.15 | 1.0 |
| Baffles |  |  |  |  |  |
| Number | 3 | 3 | 1 | (not used) | (not used) |
| J/D width/diameter | 0.09 | 0.09 | 0.22 |  |  |
| Position | Angled 120° | Angled 120° | n.a. |  |  |

In the examples 1 to 5, the impellers had a clockwise rotation and counterclockwise for example 6, when observed from a top viewpoint (downpumping flow mode in Ex. 1-4 and 6). In all the examples, the blades within each impeller are identical with each other and are equally radially spaced apart.

Comparative example 1: an impeller system with three identical axial impellers combined with baffles was used (axial stirring). Each axial impeller has 4 equally distanced blades with a blade pitch of 30°.

Comparative example 2: an impeller system with two identical radial impellers and one axial impeller combined with baffles was used (axial-radial-axial configuration). Each axial impeller has 4 equally distanced blades with a blade pitch of 30°. The radial impeller is a Rushton impeller with 6 equally distanced flatblades.

Comparative examples 3, 4: an impeller system with three identical radial impellers combined with baffles was used (radial stirring). Each radial impeller is a Rushton impeller with 6 equally distanced flatblades.

Comparative example 5: an impeller system with two identical radial impellers and no baffles was used (radial stirring). Each radial impeller is a straight blade (flat).

Figure 3:
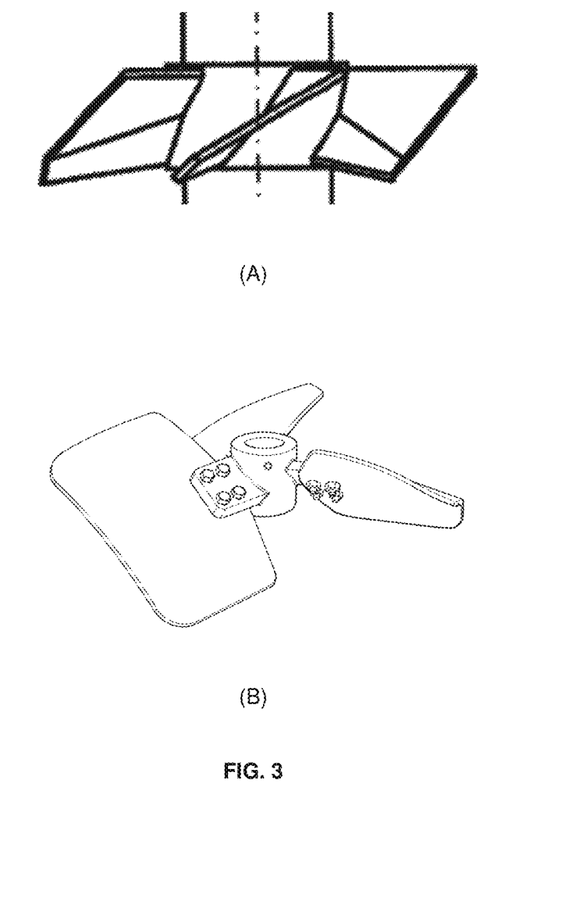
FIG. 3 shows two hydrofoil impellers: a hydrofoil impeller with five pitched blades having two regions with different pitch connected along a line (A), and a hydrofoil impeller with three pitched curved blades (B).

Example 6: an impeller system with five identical hydrofoil impellers and no baffles was used. Therefore, this system has a lower impeller, three intermediate impellers, and an upper impeller, each one as defined in the above table for Ex. 6. Each hydrofoil impeller has 5 equally distanced hydrofoil blades with a blade pitch of 32° at the tip and 55° at the hub or the near-shaft region (impeller according to FIG. 3A).

The results obtained in these examples are shown in the following table.

|  | Ex. 1 (comp.) | Ex. 2 (comp.) | Ex. 3 (comp.) | Ex. 4 (comp.) | Ex. 5 (comp.) | Ex. 6 |
|---|---|---|---|---|---|---|
| SAN (% wt) | 40.8 | 38.8 | 39.6 | 33 | 32.3 | 40 |
| Viscosity (cp) | 7170 | 6172 | 6107 | 6035 | 4081 | 6936 |
| d (0.1) (micrometer) | 0.213 | 0.19 | 0.156 | 0.066 | 0.072 | 0.155 |
| d (0.5) (micrometer) | 0.468 | 0.348 | 0.297 | 0.13 | 0.154 | 0.286 |
| d (0.9) (micrometer) | 1.17 | 0.705 | 0.614 | 0.258 | 0.348 | 0.503 |
| Span | 2.045 | 1.480 | 1.542 | 1.477 | 1.792 | 1.217 |
| Conversion (%) | 95 | 88 | 91 | 90.4 | 87.5 | 92 |

As shown above, Example 6 (stirring system with hydrofoil impellers and no baffles) yields a polymer polyol with a narrower particle size distribution (span) than axial stirring systems (comparative Ex. 1), radial stirring systems (comparative Ex. 3, 4 and 5) and mixed axial/radial stirring systems (comparative Ex. 2).

It also results in a polymer polyol with higher conversion and solid content than mixed axial/radial (comparative Ex. 2) and radial stirring systems (comparative Ex. 3, 4 and 5).

It has been also shown that the use of the stirring system according to the invention allows obtaining polymer polyols with suitable properties without the need of baffles in the reactor.

General Process for the Continuous Polymer Polyol Synthesis

The polymer polyols were prepared in two reactors connected in series, provided with stirrers and with temperature, flow and pressure control (backpressure control valve at the outlet of the second reactor). The second reactor was connected to the first one in series. A pre-mixed solution of reactants was pumped continuously into the first reactor in series. Reactor feed enters from the bottom of the reactor and exits from the top. Once stationary state has been reached, reaction output product is collected from the second reactor in a stirred tank with a thermal jacket for heating and connection to a vacuum system, to perform flash evaporation and stripping of the final product of the reaction, in order to remove volatiles. Reaction was performed at 125° C., 3 barg and 30 minutes residence time per reactor.

|  | % wt |
|---|---|
| Macromer B | 2.82 |
| SM | 30.90 |
| ACN | 12.40 |
| Polyol A | 51.70 |
| CTA | 0.52 |
| Initiator A | 0.43 |

This process was performed in reactors with the following configurations:

| Example | 7 (comparat.) | 8 |
|---|---|---|
| H/D | 2.4 | 2.4 |
| Bottom Vessel Shape | Ellipsoidal | Ellipsoidal |
| Lower Impeller | | |
| Impeller type | R-100 Lightnin (Rushton) | A320 Lightnin (wide blade Hydrofoil) |
| Tip speed (m/s) | 2.53 | 3.34 |
| Da/W | 5.0 | 4.1 |
| Da/L | 4.1 | 2.0 |
| D/Da | 2.4 | 1.8 |
| h/Da | 0.99 | 0.94 |
| Middle Impeller | | |
| Impeller type | R-100 Lightnin (Rushton) | A320 Lightnin (wide blade Hydrofoil) |
| Tip speed (m/s) | 2.53 | 3.34 |
| Da/W | 5.0 | 4.1 |
| Da/L | 4.1 | 2.0 |
| D/Da | 2.4 | 1.8 |
| G/Da | 1.2 | 0.8 |
| Top Impeller | | |
| Impeller type | R-100 Lightnin (Rushton) | A320 Lightnin (wide blade Hydrofoil) |
| Tip speed (m/s) | 2.53 | 3.34 |
| Da/W | 5.0 | 4.1 |
| Da/L | 4.1 | 2.0 |
| D/Da | 2.4 | 1.8 |
| G/Da | 1.2 | 0.8 |
| Baffles | | |
| Number | 4 | (not used) |
| J/D (width/diameter) | 0.09 | |
| Position | Off the wall | |

In all the examples, the impellers had a clockwise rotation when observed from a top viewpoint (downpumping flow mode in all cases). In all the examples, the blades within each impeller are identical with each other and are equally radially spaced apart.

Comparative example 7: an impeller system with three identical radial impellers combined with baffles was used. Each radial impeller is a Rushton impeller with 6 equally distanced flatblades (Lightnin R100 Rushton Impeller).

Example 8: an impeller system with three identical hydrofoil impellers and no baffles was used. Each hydrofoil impeller has 3 equally distanced curved blades (Lightnin A320 Hydrofoil Impeller-impeller according to FIG. 3B).

The results obtained in these examples are shown in the following table.

|  | Ex. 7 (comparat.) | Ex. 8 |
|---|---|---|
| Time in operation (days) | 30 | 70 |
| SAN (% wt) | 40.1 | 40.4 |
| Viscosity (cp) | 4000 | 4012 |
| d (0.1) (micrometer) | 0.35 | 0.404 |
| d (0.5) (micrometer) | 0.848 | 0.934 |
| d (0.9) (micrometer) | 2.07 | 2.19 |

-continued

|  | Ex. 7 (comparat.) | Ex. 8 |
|---|---|---|
| Span | 2.027 | 1.917 |
| X (%) | 86.1 | 86.6 |

As shown above, Example 8 (stirring system with hydrofoil impellers and no baffles) yields a polymer polyol with a narrower particle size distribution (span) than radial stirring system (comparative Ex. 7). It also results in a polymer polyol with higher conversion and solid content.

It has been also shown that the time of operation with the stirring system of the invention (Ex. 8) is more than twice the time of operation with a stirring system having radial impellers (comparative Ex. 7). This proves that the stirring system of the invention allows a continuous operation without baffles, which reduces internal fouling and maintenance problems significantly.

The invention claimed is:

1. A method for preparing a polymer polyol, comprising reacting a base polyol, at least one ethylenically unsaturated monomer, and a macromer or a preformed stabilizer, in the presence of a free-radical initiator and optionally a chain transfer agent in a reactor (1), wherein said reactor (1) is stirred by means of a stirring system comprising a shaft (2) rotatable about its longitudinal axis (3), and a plurality of radially extending hydrofoil impellers (4) mounted on the shaft (2) and respectively axially spaced apart and wherein the reactor (1) does not contain baffles.

2. The method according to claim 1, wherein the stirring system comprises 3-6 radially extending hydrofoil impellers (4) mounted on the shaft (2).

3. The method according to claim 1, wherein each hydrofoil impeller (4) comprises 2, 3, 4, 5 or 6 blades (5).

4. The method according to claim 1, wherein the shaft (2) is placed centrally and vertically in the reactor (1).

5. The method according to claim 1, wherein all the hydrofoil impellers (4) are identical.

6. The method according to claim 1, wherein the ratio of the internal diameter of the reactor (1) to the diameter of the hydrofoil impellers (4) is 1.2-4.0.

7. The method according to claim 1, wherein the ratio of the axial distance between each hydrofoil impeller (4) and the diameter of the hydrofoil impellers (4) is 0.5-1.5.

8. The method according to claim 1, wherein the reactor is a cylindrical reactor.

9. The method according to claim 1, wherein:
the ratio of the blade length to blade height in each hydrofoil impeller (4) is 1.0-3.0; and/or
the ratio of the hydrofoil impeller diameter to the blade height is 2.5-6.5; and/or
the ratio of the hydrofoil impeller diameter to the blade length is 2.0-5.0; and/or
the ratio between the distance from the bottom hydrofoil impeller (4) to the internal bottom of the reactor (1) and the hydrofoil impeller diameter is 0.08-1.8.

10. The method according to claim 1, wherein the tip speed of the hydrofoil impellers (4) is between 2.5 and 10.0 m/s.

11. The method according to claim 1, wherein the method is performed as a semi-batch process or as a continuous process.

12. The method according to claim 1, wherein at least part of the base polyol, the at least one ethylenically unsaturated monomer, the free-radical initiator and the optional chain transfer agent are fed to the reactor through an inlet port at the bottom of the reactor.

13. The method according to claim 1, wherein:
the base polyol is a polyether polyol; and/or
the at least one ethylenically unsaturated monomer is a mixture of styrene and acrylonitrile.

14. A method for preparing a polyurethane which comprises preparing a polymer polyol by a method as defined in claim 1 and reacting the resulting polymer polyol with a polyisocyanate.

15. The method according to claim 1, wherein the stirring system comprises 3-5 radially extending hydrofoil impellers (4) mounted on the shaft (2).

16. The method according to claim 1, wherein each hydrofoil impeller (4) comprises 3, 4 or 5 blades (5).

17. The method according to claim 1, wherein the ratio of the internal diameter of the reactor (1) to the diameter of the hydrofoil impellers (4) is 1.5-3.5.

18. The method according to claim 1, wherein the ratio of the axial distance between each hydrofoil impeller (4) and the diameter of the hydrofoil impellers (4) is 0.5-1.2.

19. The method according to claim 1, wherein the base polyol is a polyether polyol with a number average molecular weight of from 1,500 to 12,000 Da.

20. The method according to claim 1, wherein the base polyol is a polyether polyol built up of propylene oxide and ethylene oxide units, with a hydroxyl functionality from 2 to 6 and with a number average molecular weight of from 1,500 to 12,000 Da.

* * * * *